United States Patent [19]

Shikakura

[11] Patent Number: 5,600,374
[45] Date of Patent: Feb. 4, 1997

[54] IMAGE ENCODING/DECODING APPARATUS

[75] Inventor: Akihiro Shikakura, Kawasaki, Japan

[73] Assignee: Canon Kabushiki Kaisha, Tokyo, Japan

[21] Appl. No.: 300,460

[22] Filed: Sep. 2, 1994

[30] Foreign Application Priority Data

Sep. 17, 1993 [JP] Japan .................................. 5-231136

[51] Int. Cl.$^6$ ....................................................... H04N 7/50
[52] U.S. Cl. ........................................... 348/398; 348/423
[58] Field of Search ..................................... 348/398, 423; H04N 7/50

[56] References Cited

U.S. PATENT DOCUMENTS 5,353,059  10/1994  Lawlor et al. ........................... 348/398
5,491,523   2/1996  Sato ........................................ 348/398

Primary Examiner—Howard W. Britton
Attorney, Agent, or Firm—Fitzpatrick, Cella, Harper & Scinto

[57] ABSTRACT

An image encoding/decoding apparatus in which on the transmission side, image information is divided into at least two or more signal groups by a frequency band, the plurality of signal groups are individually high efficiency encoded, an error correction code is added to each of the plurality of encoded signal groups. The resultant signal groups are then multiplexed and transmitted. On the reception side, the transmitted multiplexed signal is divided into the signal groups for every frequency band divided on the transmission side, the error correction and the decoding of the high efficiency encoded data are executed for every signal group, and the plurality of signal groups after decoding are frequency band synthesized, thereby reproducing the image information. At least two kinds of error correction codes of different error correcting abilities are used as error correction codes which are added to the plurality of signal groups on the transmission side.

14 Claims, 6 Drawing Sheets

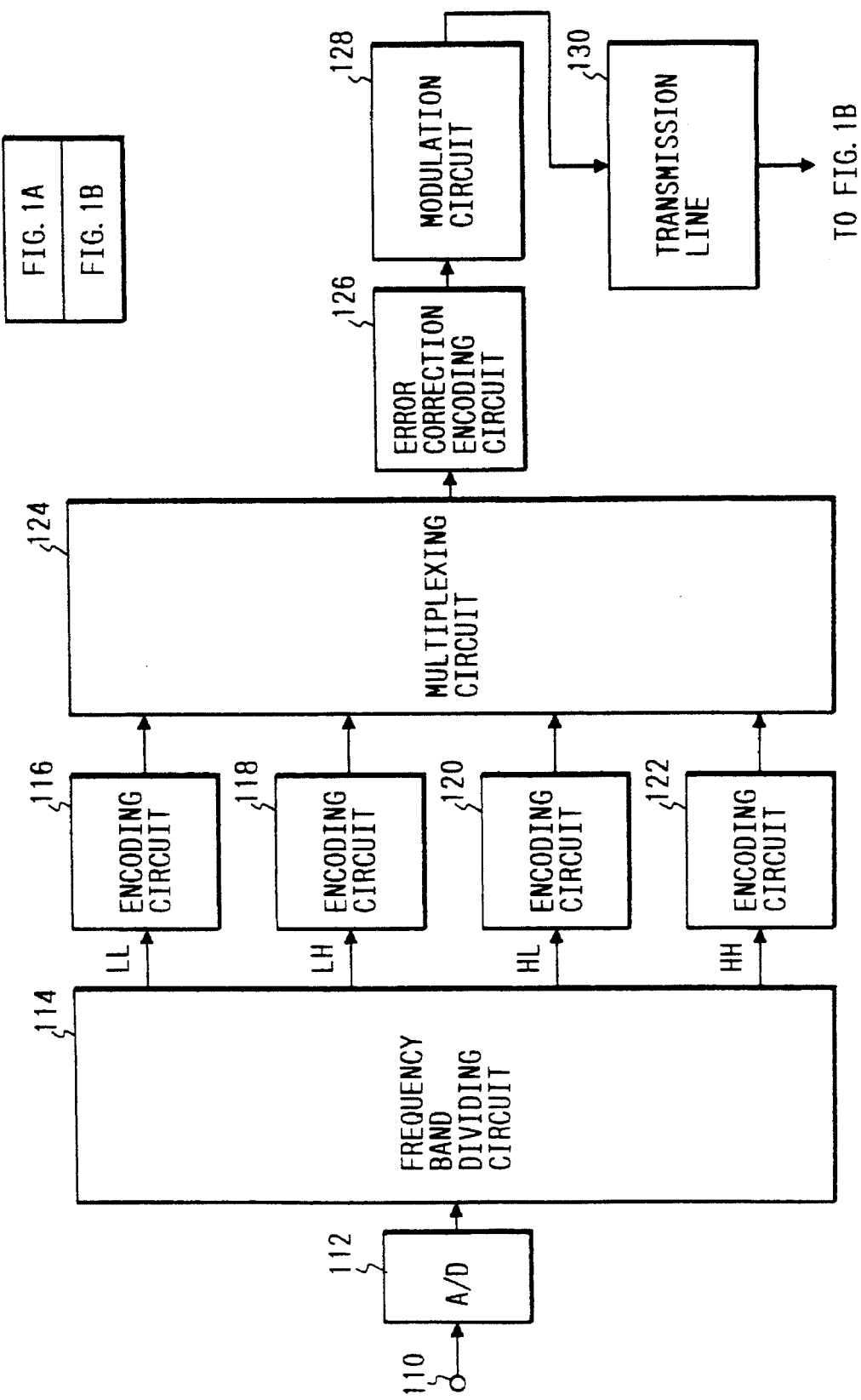
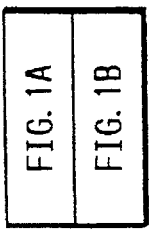
FIG. 1 (PRIOR ART)
FIG. 1A (PRIOR ART)

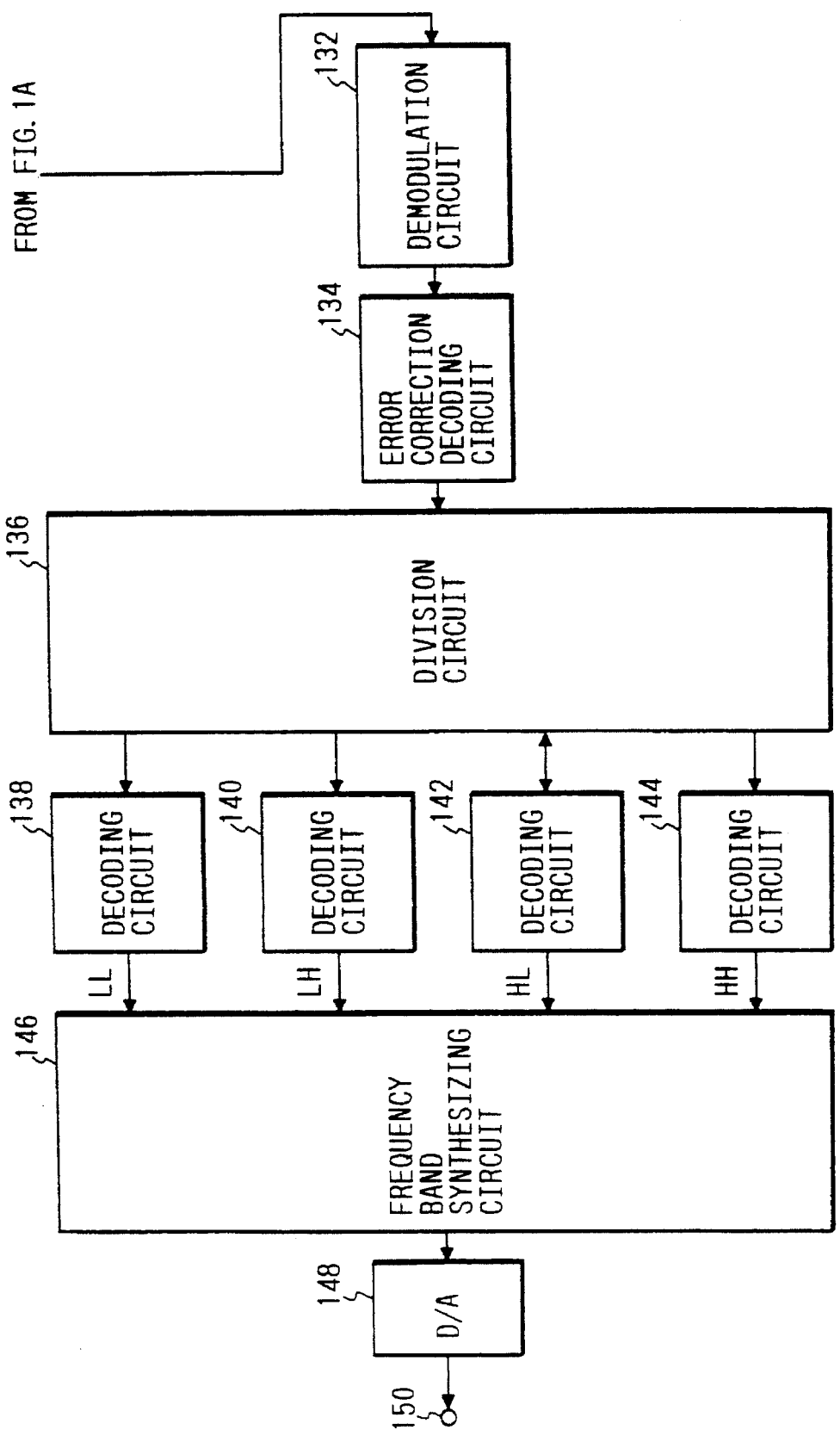

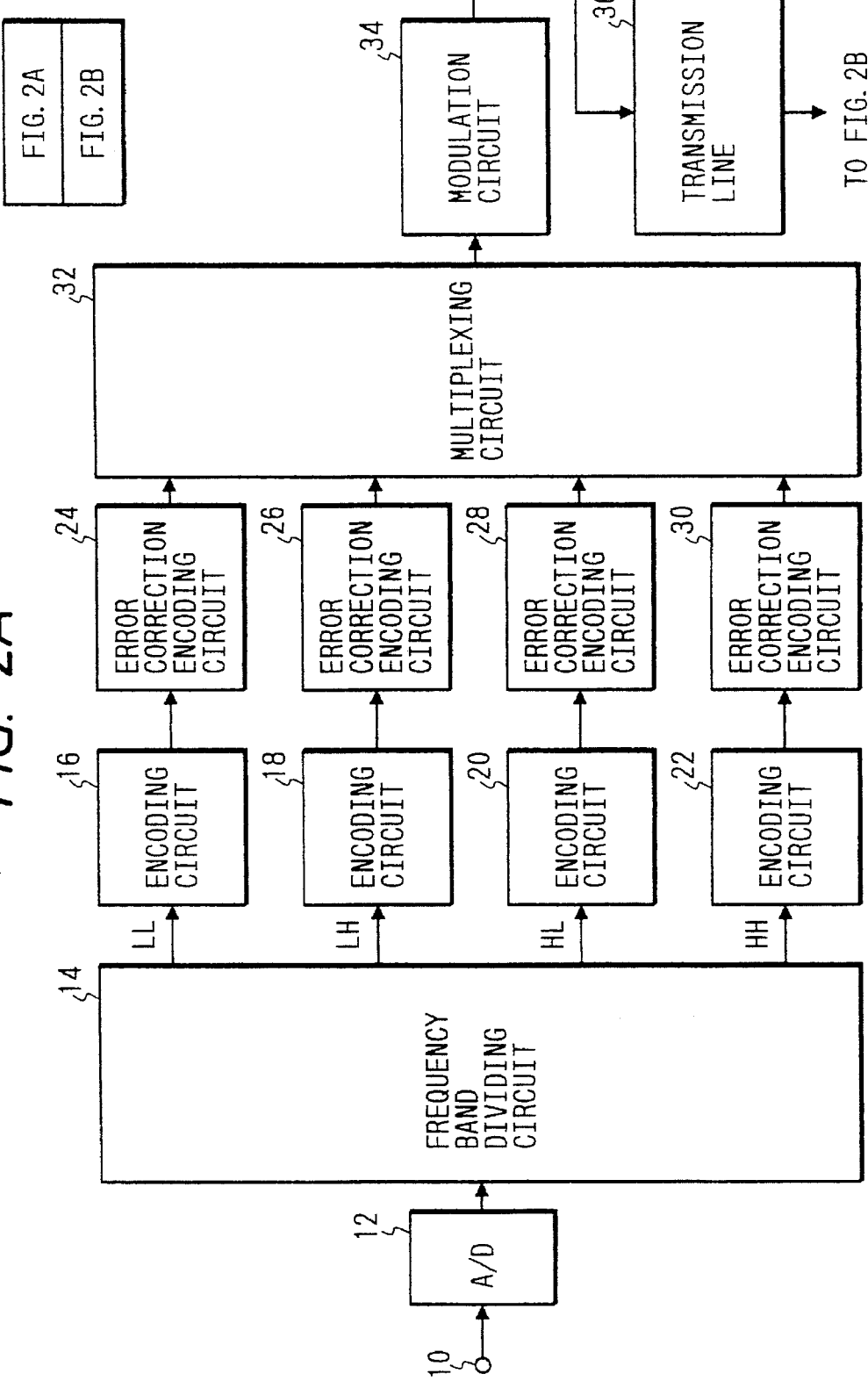

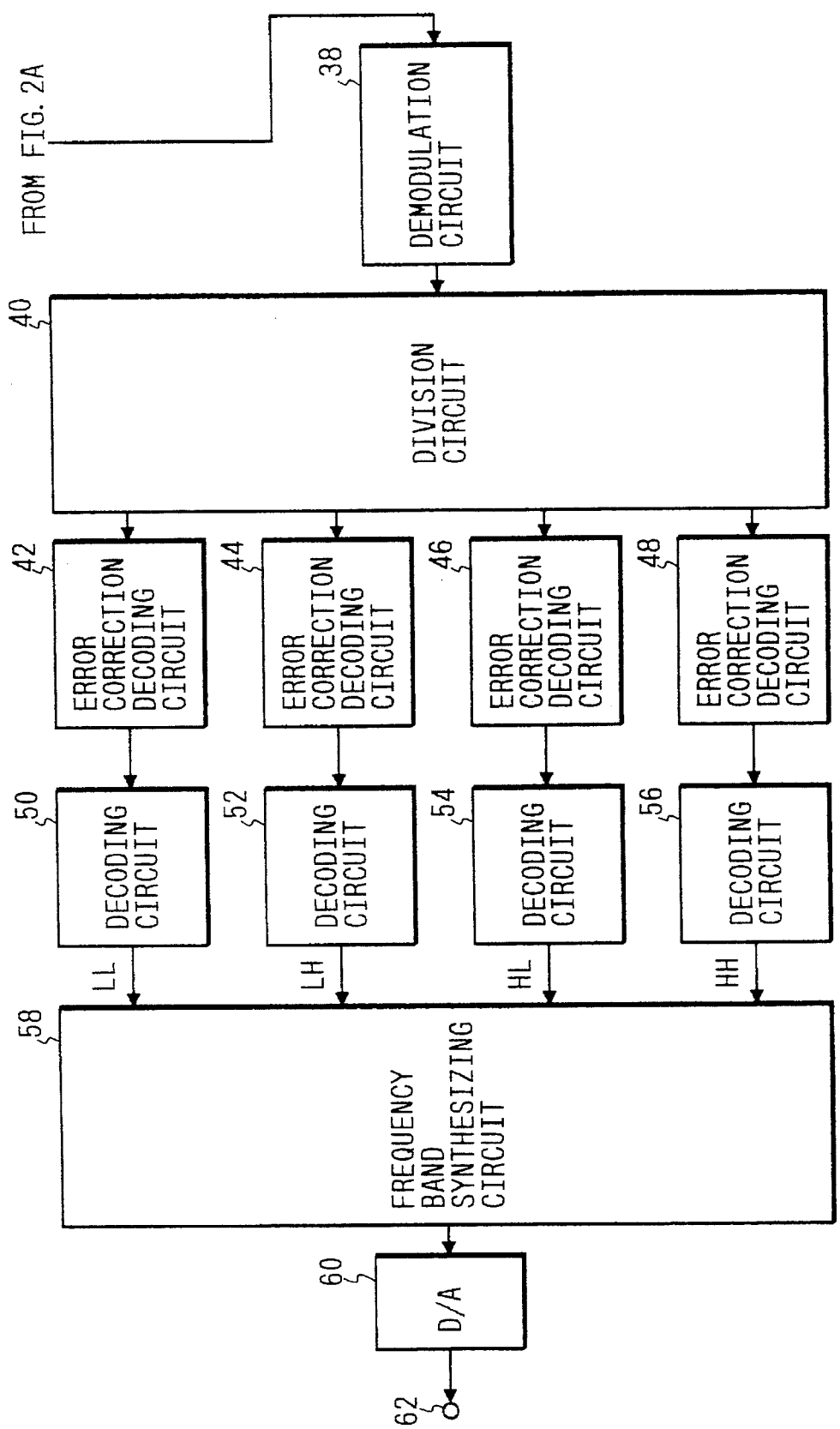

IMAGE ENCODING/DECODING APPARATUS

BACKGROUND OF THE INVENTION

1. Field of the Invention

The present invention relates to an image encoding/decoding apparatus for high efficiency encoding/decoding of image information.

2. Related Background Art

In recent years, in the field of digital transmission of a moving image, research of a high efficient encoding technique has been positively performed and image encoding/decoding apparatuses using various encoding methods have been proposed. As one of those methods, there is an encoding method whereby image information is divided into a plurality of frequency bands and optimum encoding is performed on each of the divided signals. FIGS. 1A and 1B are block diagrams of the conventional image encoding/decoding apparatus using this method.

An analog image signal supplied to an input terminal 110 is converted to a digital signal by an analog/digital (A/D) converter 112. A frequency band dividing circuit 114 comprising a digital filter or the like divides the digital image signal which is output from the A/D converter 112 into a plurality of signal groups of predetermined frequency bands. In the example of FIGS. 1A and 1B, the frequency band of the original signal is divided into four equal bands and are set to LL, LH, HL, and HH from the lower frequency side. The frequency band dividing circuit 114 supplies the signal (or signal group) LL on the lowest frequency side, the signal (or signal group) LH, the signal (or signal group) HL, and the signal (or signal group) HH on the highest frequency side to high efficiency encoding circuits 116, 118, 120, and 122, respectively.

As for the division of the frequency band, if the number of data after completion of the division to four frequency bands is equal to the original number of sample data, the number of data is increased to the value that is four times as large as the number of original sample data. Therefore, from a viewpoint of information compression, a process for down-sampling each signal to ¼ size is often executed. In order to prevent a loss of information at the time of filtering, there are many cases where filter characteristics for the frequency band division are set so as to be partially overlapped with each other.

In general, when a signal is divided into a few frequency bands as mentioned above, electric power is often concentrated to a special frequency band, ordinarily, to the low frequency side. The signals LL, LH, HL, and HH produced by the frequency band dividing circuit 114 have different characteristics. By using those deviations, the high efficiency encoding circuits 116 to 122 encode the signals LL, LH, HL, and HH by encoding methods according to the signal characteristics.

The signals encoded by the high efficiency encoding circuits 116 to 122 are multiplexed by a multiplexing circuit 124 and the multiplexed signal is supplied to an error correction encoding circuit 126. The error correction encoding circuit 126 adds (error correction encoding) a parity bit for code error correction to the multiplexed data from the multiplexing circuit 124. A modulation circuit 128 modulates the multiplexed data which was error correction encoded by the error correction encoding circuit 126 in accordance with the characteristics of a transmission line 130, for example, by a QPSK method in case of satellite transmission and transmits the modulated signal to the transmission line 130.

On the reception side, a demodulation circuit 132 demodulates a data train which is input from the transmission line 130. An error correction decoding circuit 134 corrects the transmission error by using the parity bit. In the case where an uncorrectable error occurs, the error correction decoding circuit 134 sets an error flag to the high level so as to enable the encoding data including the error to be corrected by replacing it with other data upon decoding. Such a process is well known.

The error corrected multiplexed data is input to a division circuit 136. The division circuit 136 divides the input data into four frequency bands in a manner similar to the dividing process at the time of encoding. In this case, delimiter information of each data has previously been inserted at the time of data multiplexing and it is now assumed that the data division is executed on the basis of the delimiter information.

The four data divided by the division circuit 136 are sequentially supplied to high efficient decoding circuits 138, 140, 142, and 144 in accordance with the order from the low frequency side. The decoding circuits 138 to 144 perform the decoding processes corresponding to the encoding circuits 116 to 122 on the transmission side. Namely, the decoding circuit 138 generates a decoded signal of the signal LL in the lowest frequency band, the decoding circuit 140 generates a decoded signal of the signal LH, the decoding circuit 142 generates a decoded signal of the signal HL, and the decoding circuit 144 generates a decoded signal of the signal HH.

The signals of the frequency bands decoded by the decoding circuits 138 to 144 are supplied to a frequency band synthesizing circuit 146 and is frequency band synthesized by a process opposite to the process at the time of frequency band division. The frequency band synthesizing circuit 146 comprises a digital filter or the like in a manner similar to the frequency band dividing circuit 114. In the case where the down-sampling process has been executed at the time of frequency band division, an up-sampling is also executed as an opposite process before filtering.

In the case where an uncorrectable error occurred in the error correction decoding circuit 134 although not shown, the uncorrectable image data is corrected at the front stage or post stage of the frequency band synthesizing circuit 146 on the basis of the flag information.

The digital image signal reconstructed as mentioned above is converted into an analog signal by a D/A converter 148 and is output as an analog image signal from an output terminal 150 to the outside.

However, in the conventional apparatus, in the case where an uncorrectable error occurs on the transmission path, the image correction is performed as mentioned above, so that image quality deteriorates. Particularly, even in case of the same errors, when an uncorrectable error occurs in the encoded data in a low frequency band which is most important upon decoding of the image signal, there is a situation such that a degree of deterioration of the image quality increases even if the image is corrected. Its influence is larger than that by a degree of deterioration of the image quality in the case where an uncorrectable error occurs in the encoded data in high frequency regions other than the low frequency region.

In the conventional apparatus, similar processes are performed on errors which occur on the transmission path with respect to any one of the divided frequency bands. In other words, nothing is considered about a countermeasure to especially prevent a large deterioration of the image quality due to an error of the data in the low frequency band.

SUMMARY OF THE INVENTION

In the above background situation, it is an object of the present invention to provide an image encoding/decoding apparatus which can minimize a phenomenon such that an uncorrectable error occurs in data in a low frequency band that is specially important at the time of reproduction of an image and an image quality of the reproduction image is deteriorated.

To accomplish the above object, according to one preferred embodiment, there is provided an image encoding/ decoding apparatus in which, on the transmission side, image information is divided into at least two or more signal groups by frequency bands, the plurality of signal groups are individually high efficiency encoded, an error correction code is added to each of the plurality of encoded signal groups, and after that, the resultant signal groups are multiplexed and transmitted, and on the reception side, the transmitted multiplexed signal is divided into the signal groups of the frequency bands divided on the transmission side, an error correction and a decoding of the high efficiency encoded data are executed every signal group, and the plurality of signal groups after decoding are frequency band synthesized, thereby reproducing image information, wherein the apparatus is characterized in that at least two or more kinds of error correction codes having different error correcting abilities are used as an error correction code which is added to the plurality of signal groups on the transmission side.

Other objects, features, and advantages of the invention will become apparent from the following detailed description taken in conjunction with the accompanying drawings.

BRIEF DESCRIPTION OF THE DRAWINGS

FIG. 1 is comprised of FIGS. 1A and 1B which are block diagrams of a conventional image encoding/decoding apparatus;

FIG. 2 is comprised of FIGS. 2A and 2B which are block diagrams of an image encoding/decoding apparatus according to an embodiment of the invention;

DETAILED DESCRIPTION OF THE PREFERRED EMBODIMENT

Figure 3:
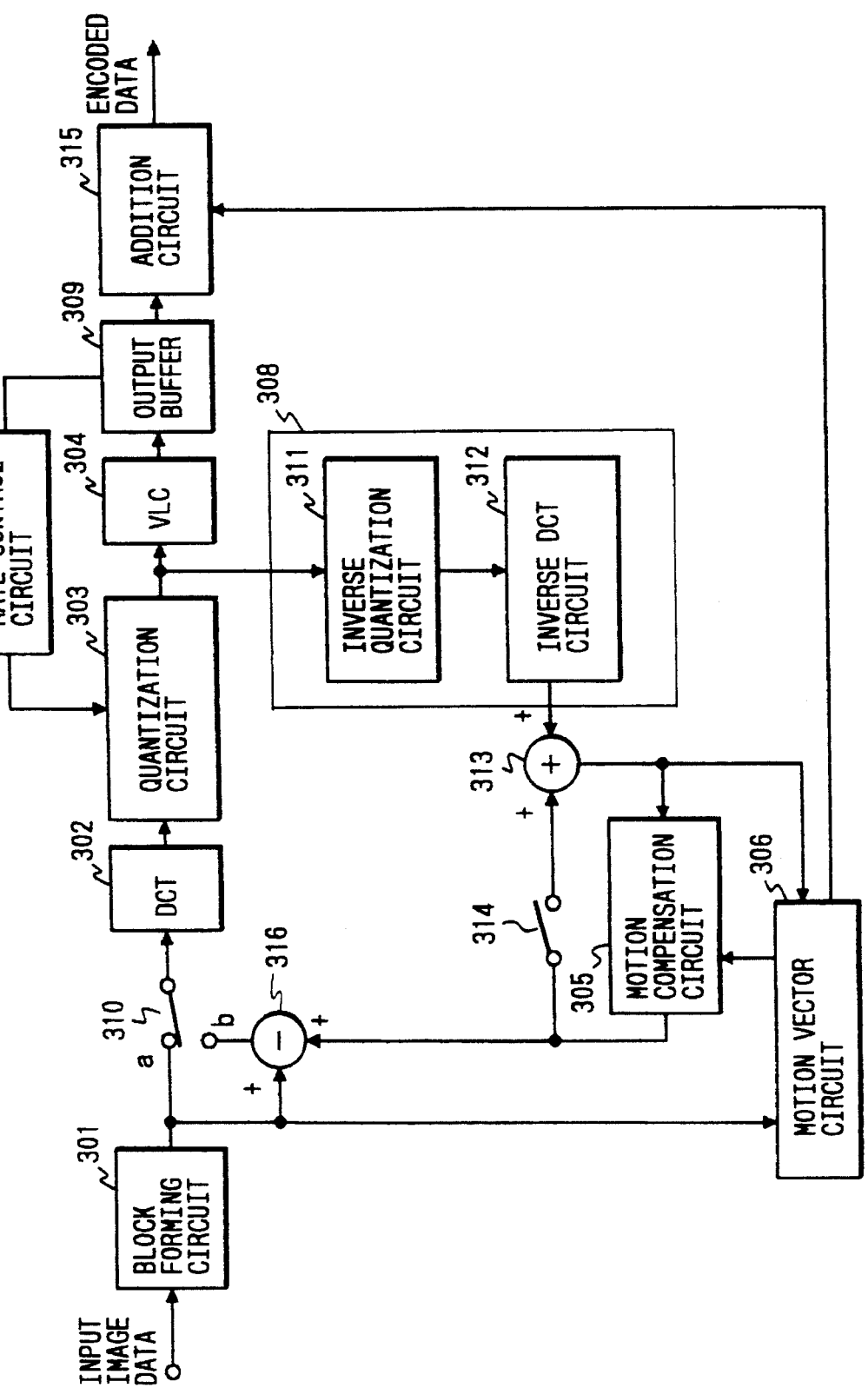
FIG. 3 is a block diagram of the details of encoding circuits 16, 18, 20, and 22 in FIG. 2A.

An embodiment of the invention will now be described hereinbelow with reference to the drawings.

FIGS. 2A and 2B are block diagrams of an image encoding/decoding apparatus according to an embodiment of the invention.

Processes of the image encoding/decoding apparatus shown in FIGS. 2A and 2B will now be described.

An analog image signal input to an input terminal 10 is converted into a digital signal by an A/D converter 12. A frequency band dividing circuit 14 comprising a digital filter or the like divides the digital image signal generated by the A/D converter 12 into a plurality of signal groups of predetermined frequency bands. High efficiency encoding circuits 16, 18, 20, and 22 high efficiency encode the signal groups by encoding methods according to the signal groups. The above construction is substantially the same as that of the conventional apparatus.

That is, the frequency band dividing circuit 14 divides the digital image signal into four frequency band signals (or signal groups) LL, LH, HL, and HH and supplies the signals LL, LH, HL, and HH to the encoding circuits 16, 18, 20, and 22, respectively. The frequency band dividing circuit 14 down-samples the divided frequency band signals to ¼ size and outputs the down-sampled signals in a manner similar to the frequency band dividing circuit 114. In order to prevent a loss of information at the time of filtering, filter characteristics for frequency band division are set so as to partially overlap each other.

A large amount of information after decoding is preferentially allocated or an advanced encoding process is performed or the like on a low frequency component that is especially important at the time of decoding of image data, thereby improving the image quality of the reproduction image on the decoding side. From such a point of view, for instance, as for the signal LL on the lowest frequency band side to which electric power is concentrated, in order to prevent a loss of information if possible, an encoding method such as a hybrid DCT method which can efficiently compress the information, although it is complicated, is used, so that an amount of information after encoding which is allocated to the signal LL is set to a value larger than those of the other signals. With respect to the other signals LH, HL, and HH, an encoding method having a relatively simple hardware construction such as a DCPM method is used or a method such that amounts of information after encoding which are allocated to those signals are reduced or the like is used. Due to this, it is possible to realize an encoding method which can compress an information amount to a smaller amount as a whole and can realize a high image quality at the time of decoding.

A practical circuit construction of the encoding circuits 16, 18, 20, and 22 in FIG. 2A will now be described.

FIG. 3 is a block diagram of the details of the encoding circuits 16, 18, 20, and 22 in FIG. 2A.

The encoding circuit shown in FIG. 3 includes a block forming circuit 301; a DCT (discrete cosine transform) circuit 302; a quantization circuit 303; a variable length encoding circuit (VLC) 304; a motion compensation circuit 305; a motion vector circuit 306; a rate control circuit 307; a local decoding circuit 308; and an output buffer 309.

The operation of the encoding circuit shown in FIG. 3 will now be described hereinbelow.

In FIG. 3, image data to be encoded is divided into blocks of (8×8) pixels by the block forming circuit 301 and is supplied to the DCT circuit 302 through a switch 310.

The switch 310 is periodically (for example, every several frames or every several fields) switched to an (a) terminal side in order to prevent the propagation of error data.

Namely, when the switch 310 is connected to the (a) terminal side, an intraframe or intrafield encoding (intra mode) is executed.

In case of the intra mode, the block is DCT transformed by the DCT circuit 302, thereby obtaining a DCT coefficient. The DCT coefficient is quantized by the quantization circuit 303 and, further, is encoded by the variable length encoding circuit 304. After that, the encoded data is temporarily stored in the buffer 309.

On the other hand, in a mode other than the intra mode, the switch 310 is connected to a (b) terminal side, so that a predictive encoding with motion compensation is executed.

Reference numerals 311 and 312 denote an inverse quantization circuit and an inverse DCT circuit, respectively which form the local decoding circuit 308. The data quantized by the quantization circuit 303 is decoded into the original image data by the local decoding circuit 308.

Reference numeral 313 denotes an adding circuit; 314 a switch which is closed in a mode other than the intra mode; and 316 a subtracting circuit.

As for the image data which was locally decoded, the corresponding block in a predetermined frame (preceding frame, post frame, or interpolation frame) is output with reference to the motion vector detected by the motion vector circuit 306.

A subtraction is performed between an output of the motion compensation circuit 305 and the input image data from the block forming circuit 301 by the subtracting circuit 316, thereby obtaining a differential value.

The differential value is encoded by the DCT circuit 302, quantization circuit 303, and variable length encoding circuit 304 and is stored in the buffer 309.

The motion vector circuit 306 compares the frame data to be encoded from now on with predetermined reference frame data, thereby obtaining a motion vector. An output of the motion vector circuit 306 is supplied to the motion compensation circuit 305, thereby designating a block to be output by the motion compensation circuit 305.

The rate control circuit 307 controls a code amount by switching the quantization steps in the quantization circuit 303 on the basis of an occupation ratio of the encoded data in output buffer 309.

Finally, the motion vector data detected by the motion vector circuit 306 and an encoding ID code for discriminating whether the mode is the intra mode or not are added by an addition circuit 315 and the result is output as encoded data.

In the embodiment, in order to give a large code amount to the image data of the low frequency component as much as possible (code amount: LL>LH>HL>HH), the encoding circuits with the construction shown in FIG. 3 are used as encoding circuits 16, 18, 20, and 22. However, rate controls of the encoding circuits are different.

That is, the rate control is performed in accordance with the occupation ratio of the encoded data in the buffer 309 as mentioned above. However, the controls due to the foregoing occupation ratio are different in the encoding circuits 16, 18, 20, and 22 in FIG. 2A.

Returning to FIGS. 2A and 2B, a further description thereof will be provided.

Outputs of the encoding circuits 16 to 22 are supplied to error correction encoding circuits 24, 26, 28, and 30 and are individually error correction encoded. The error correction encoding circuits 24, 26, 28, and 30 use the error correction codes of different correcting abilities. Thus, a proper error correcting ability can be added in accordance with a degree of significance of each signal group obtained by division into a plurality of frequency bands.

Practically speaking, a high error correcting ability is given to the data in the low frequency band (output data of the high efficient encoding circuit 16) which is especially important at the time of decoding of the image data. A code having a low error correcting ability is used for the high frequency band (output data of the high efficiency encoding circuit 22) which is not so important as compared with the low frequency band. Due to this, a high efficiency error correction can be performed without increasing redundancy due to an additional bit for the error correction.

As error correction codes having different error correcting abilities which are used in this instance, the same kind of error correction codes of a different redundancies can be used or different kinds of error correction codes can be also used. In the former case, for example, Reed Solomon codes are used for all of the error correction codes of the error correction encoding circuits 24 to 30. (code length, information length) of the codes are set to [(64, 56), (64, 58), (64, 60), and (64, 62)] or the like, thereby maximizing the error correcting ability of the error correction code in the error correction encoding circuit 24 and minimizing the error correcting ability in the error correction encoding circuit 30.

In the latter case, for example, the error correcting abilities are made different by using a plurality of different codes in a manner such that (the convolution code + the Viterbi decoding) are used for the error correction code in the error correction encoding circuit 24, the Reed Solomon codes are used for the error correction codes in the error correction encoding circuits 26 and 28, and the Hamming code is used for the error correction code in the error correction encoding circuit 30.

In the embodiment as well, there is no need to make all of the error correcting abilities in the error correction encoding circuits 24, 26, 28, and 30 different and it is sufficient to selectively use the error correction codes having two or more kinds of error correcting abilities in accordance with a system that is applied.

The signal which was error correction encoded as mentioned above is multiplexed on a time base by a multiplexing circuit 32. A modulation circuit 34 modulates the multiplexed data from the multiplexing circuit 32 in accordance with the characteristics of a transmission line 36 and sends the modulated data to the transmission line 36. In case of a satellite transmission, a 4 PSK (phase shift keying) method or the like is used.

On the reception side, the data train supplied from the transmission line 36 is demodulated by a demodulation circuit 38. A division circuit 40 divides the demodulated data into the same four frequency bands as those in case of dividing the demodulated data at the time of encoding. In a manner similar to the conventional apparatus, it is assumed that delimiter information of each data has previously been inserted at the time of data multiplexing and the data division is executed on the basis of the delimiter information.

The divided four data are sequentially supplied to error correction decoding circuits 42, 44, 46, and 48 in accordance with the order from the low frequency band side. The error correction decoding circuits 42, 44, 46, and 48 correct transmission errors by using parity bits added to the corresponding error correction encoding circuits 24, 26, 28, and 30. In the case where an uncorrectable error occurs, each of the error correction decoding circuits 42, 44, 46, and 48 sets a flag to the high level so that the image can be corrected by replacing the code data including the error to other data at the time of decoding and supplies it to a circuit at the post stage.

The error corrected encoded data in each frequency band is supplied to decoding circuits 50, 52, 54, and 56 corresponding to the high efficiency encoding circuits 16, 18, 20, and 22 on the transmission side and is decoded. Namely, the decoding circuit 50 outputs the decoded signal of the signal LL in the lowest frequency band, the decoding circuit 52 outputs the decoded signal of the signal LH, the decoding circuit 54 outputs the decoded signal of the signal HL, and the decoding circuit 56 outputs the decoded signal of the signal HH. Thus, the image signals in four frequency bands are reproduced.

A practical circuit construction of each of the decoding circuits 50, 52, 54, and 56 in FIG. 2B will now be described.

Figure 4:
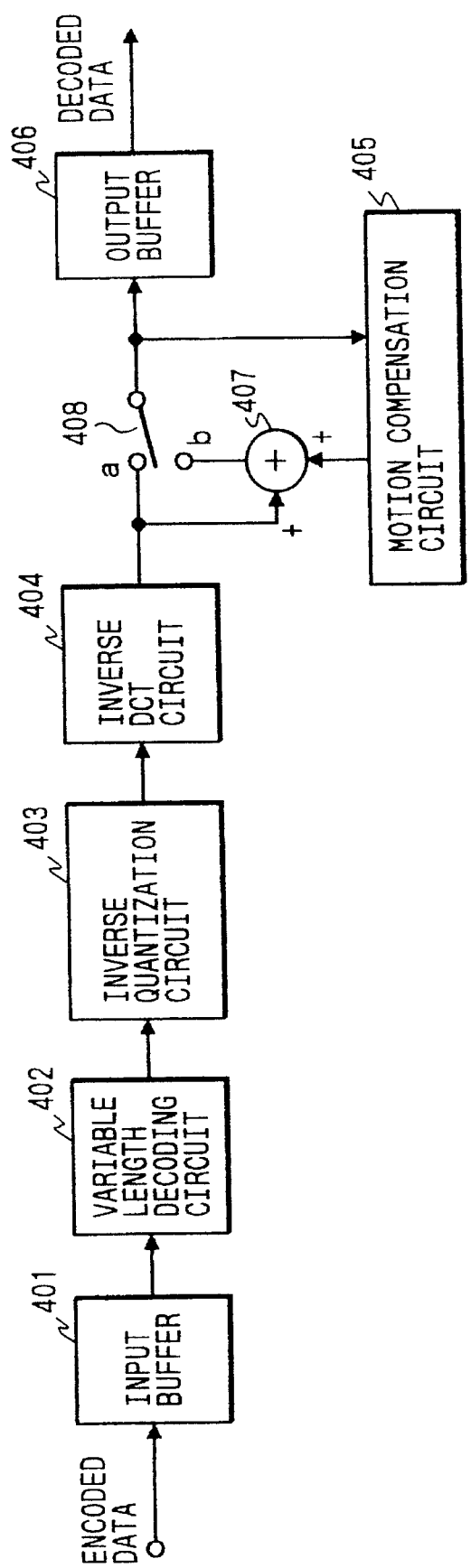
FIG. 4 is a block diagram of the details of decoding circuits 50, 52, 54, and 56 in FIG. 2B.

FIG. 4 is a block diagram showing the details of each of the decoding circuits 50, 52, 54, and 56 in FIG. 2B.

The decoding circuit fundamentally executes the operation opposite to that of the previously described encoding circuit.

The decoding circuit shown in FIG. 4 comprises an input buffer 401, a variable length decoding circuit 402, an inverse quantization circuit 403, an inverse DCT circuit 404, and a motion compensation circuit 405, an output buffer 406.

The encoded data which is sequentially read out from the input buffer 401 is processed by the variable length decoding circuit 402, inverse quantization circuit 403, and inverse DCT circuit 404 and is converted into data of a space region.

Reference numeral 407 denotes an adding circuit which adds a differential value from the motion compensation circuit 405 to an output valve of the inverse DCT circuit 404. Reference numeral 408 denotes a switch to select the output of the inverse DCT circuit 404 or the output of the adding circuit 407.

The switch 408 is connected to the (a) terminal side of switch in case of the intra mode on the basis of the encoding ID code detected by a data detecting circuit (not shown) and is connected to a (b) terminal side of switch 408 in a mode other than the intra mode.

The decoded data which was decoded as mentioned above is once stored in the output buffer 406 and is further reconstructed into the original space arrangement and is output as image data of one frame or one field.

Returning to FIGS. 2A and 2B, a further description thereof will be provided.

The reproduced image signals in the frequency bands are band synthesized by a frequency band synthesizing circuit 58 by a process opposite to the process at the time of frequency band division and the original digital image signal is reconstructed. The frequency band synthesizing circuit 58 is constructed by a digital filter or the like in a manner similar to the frequency band dividing circuit 14. In the case where the signal has been down-sampled at the time of frequency band division, the frequency band synthesizing circuit 58 executes an up-sampling as such an opposite process before filtering.

In the case where an uncorrectable error occurred in the error correction decoding circuits 42 to 48, the image data is corrected on the basis of the flag information at the front or post stage of the frequency band synthesizing circuit 58.

The digital image signal reconstructed as mentioned above is converted into the analog signal by a D/A converter 60 and is output as an analog image signal from an output terminal 62 to the outside.

As will be easily understood from the above description, according to the embodiment, since the error correction code of a different correcting ability can be applied to every divided frequency band, the proper error correcting ability can be provided every frequency band in accordance with the significance of each of the divided signal groups. Therefore, a situation such that uncorrectable errors remain after the error correction for the data in the low frequency region that is particularly important when reproducing the image can be reduced, so that the deterioration of the image quality due to the transmission error can be minimized. Further, since the correcting ability is provided for every divided signal in accordance with its significance, the error correction can be performed at a high efficiency without greatly increasing the redundancy due to the additional bits used for error correction.

The present invention can be embodied in many other forms without departing from the spirit or main features of the invention.

For example, although the image signal has been divided into four frequency bands in the embodiment, the invention is not limited to such an example.

The high efficient encoding method and error correction encoding method which are respectively applied to a plurality of divided signal groups are not also limited to the combinations in the embodiment.

Further, the division number for every frequency band is not necessarily identical to the number (kinds) of high efficiency encoding methods which are used and the number (kinds) of error correction codes.

In other words, the foregoing description of embodiments has been given for illustrative purposes only, and is not to be construed as imposing any limitation in any respect.

The scope of the invention is, therefore, to be determined solely by the following claims, and is not limited by the text of the specifications and alterations made within a scope equivalent to the scope of the claims fall within the true spirit and scope of the invention.

What is claimed is:

1. An image encoding apparatus comprising:
   a) input means for inputting an image signal;
   b) dividing means for dividing the image signal input by said input means into signal groups of a plurality of frequency bands;
   c) encoding means for encoding the plurality of signal groups divided by said dividing means; and
   d) adding means for adding error correction check codes weighted in accordance with the frequency band to the image signal encoded by said encoding means.

2. An apparatus according to claim 1, wherein as an error correction check code to be added to the signal of a low frequency band among the signal groups divided every frequency band, said adding means adds the error correction check code of a correcting ability higher than that of the error correction check code that is added to the signal of a high frequency band.

3. An apparatus according to claim 1, wherein said encoding means executes a block encoding using an orthogonal transformation.

4. An apparatus according to claim 1, further having multiplexing means for multiplexing said plurality of encoded signal groups.

5. An apparatus according to claim 1, wherein said encoding means executes a compression encoding weighted in accordance with the frequency band.

6. An apparatus according to claim 4, wherein, in said encoding means, a compression ratio for the signal of a low frequency band among the signal groups divided every frequency band is set to be smaller than that for the signal of a high frequency band.

7. An image decoding apparatus comprising:
   a) input means for inputting a plurality of encoded image signal groups, the plurality encoded image signal groups being formed by dividing an image signal into a plurality of signal groups of a plurality of frequency bands, encoding the plurality of divided signal groups and adding error correction check codes weighted according to the frequency bands to the plurality of encoded signal groups;

b) error code correcting means for correcting error codes of the plurality of encoded image signal groups by using the error correction check codes; and c) decoding means for decoding the plurality of encoded image signal groups processed by said error code correcting means.

8. An apparatus according to claim 7, wherein an error correction check code added to the signal of a low frequency band among the image signal groups divided every frequency band has a correcting ability higher than that of the error correction check code added to the signal of a high frequency band.

9. An image encoding/decoding apparatus comprising:

a) input means for inputting an image signal;

b) dividing means for dividing the image signal input by said input means into signal groups of a plurality of frequency bands;

c) encoding means for encoding the plurality of signal groups divided by said dividing means;

d) adding means for adding error correction check codes weighted in accordance with the frequency band;

e) error code correcting means for correcting error codes in the encoded data of the plurality of encoded signal groups by using the error correction check codes; and f) decoding means for decoding the encoded data of the plurality of encoded signal groups processed by said error code correcting means.

10. An apparatus according to claim 9, wherein as an error correction check code to be added to the signal of a low frequency band among the signal groups divided every frequency bands, said adding means adds the error correction check code of a correcting ability higher than that of the error correction check code which is added to the signal of a high frequency band.

11. An apparatus according to claim 9, wherein said encoding means executes a block encoding using an orthogonal transformation.

12. An apparatus according to claim 9, further having:

multiplexing means for multiplexing the encoded data of the plurality of signal groups encoded by said encoding means; and dividing means for dividing the multiplexed encoded data into the plurality of signal groups.

13. An apparatus according to claim 9, wherein said encoding means executes a compression encoding weighted in accordance with the frequency band.

14. An apparatus according to claim 12, wherein a compression ratio for the signal of a low frequency band among the signal groups divided every frequency band in said encoding means is set to be smaller than that for the signal of a high frequency band.

* * * * *

UNITED STATES PATENT AND TRADEMARK OFFICE
CERTIFICATE OF CORRECTION

PATENT NO. : 5,600,374

DATED : February 4, 1997

INVENTOR : AKIHIRO SHIKAKURA

Page 1 of 2

It is certified that error appears in the above-identified patent and that said Letters Patent is hereby corrected as shown below:

ON TITLE PAGE

[57] Abstract

Line 4, "an" should read --and an--.
Line 11, "efficient" should read --efficiency--.

COLUMN 5

Line 2, "respectively" should read --respectively,--.

COLUMN 6

Line 3, "a" should be deleted.

COLUMN 7

Line 12, "and" should be deleted;
Line 13, "an" should read --and an--;
Line 25, "switch" should read --switch 408--.

COLUMN 8

Line 11, "efficient" should read --efficiency--;
Line 50, "said" should read --the--;
Line 55, "claim 4," should read --claim 5,--.

UNITED STATES PATENT AND TRADEMARK OFFICE
CERTIFICATE OF CORRECTION

PATENT NO. : 5,600,374

DATED : February 4, 1997

INVENTOR : AKIHIRO SHIKAKURA

It is certified that error appears in the above-identified patent and that said Letters Patent is hereby corrected as shown below:

COLUMN 10

Line 4,  "bands," should read --band,--;
   Line 23, "claim 12," should read --claim 13,--.

Signed and Sealed this

Twenty-second Day of July, 1997

Attest:

BRUCE LEHMAN

Attesting Officer    Commissioner of Patents and Trademarks